United States Patent [19]

Peter et al.

[11] 4,203,480
[45] May 20, 1980

[54] PNEUMATIC VEHICLE TIRE

[75] Inventors: Julius Peter, Hanover; Peter Johannsen, Hannover-Herrenhausen; Gerhard Mauk, Wunstorf, all of Fed. Rep. of Germany

[73] Assignee: Continental Gummi-Werke Aktiengesellschaft, Hanover, Fed. Rep. of Germany

[21] Appl. No.: 927,883

[22] Filed: Jul. 25, 1978

[30] Foreign Application Priority Data

Jul. 29, 1977 [DE] Fed. Rep. of Germany ....... 2734213

[51] Int. Cl.² .......................... B60C 11/00; B60C 9/20
[52] U.S. Cl. .......................... 152/209 NT; 152/352 R; 152/353 R; 152/354 R; 152/361 R
[58] Field of Search ........... 152/352, 353 R, 350 WB, 152/353 C, 353 G, 361 R, DIG. 19, 209 NT, 209 WT, 354 R

[56] References Cited

U.S. PATENT DOCUMENTS 3,554,261  1/1971  Mirtain et al. ............... 152/353 R X

FOREIGN PATENT DOCUMENTS 2509941  9/1976  Fed. Rep. of Germany ........... 152/352

Primary Examiner—John T. Goolkasian
Assistant Examiner—L. E. Rodgers
Attorney, Agent, or Firm—Becker & Becker, Inc.

[57] ABSTRACT

A slightly bulged outwardly arched pneumatic vehicle tire having a tread which is narrow in relation to the width of the tire. The tire also has a belt which is pull-resistant in the circumferential direction of the tire and effects the lateral stabilization of the tire. Portions of the belt are arranged on both sides of and adjacent to the tread in sections of the tire sidewalls which are essentially cylindrical or slightly conical. In addition, the reinforcing inserts form the belt. Those reinforcing inserts located in the tire sidewalls form a considerably smaller angle with the circumferential direction of the tire than do those reinforcing inserts located below the tread.

6 Claims, 2 Drawing Figures

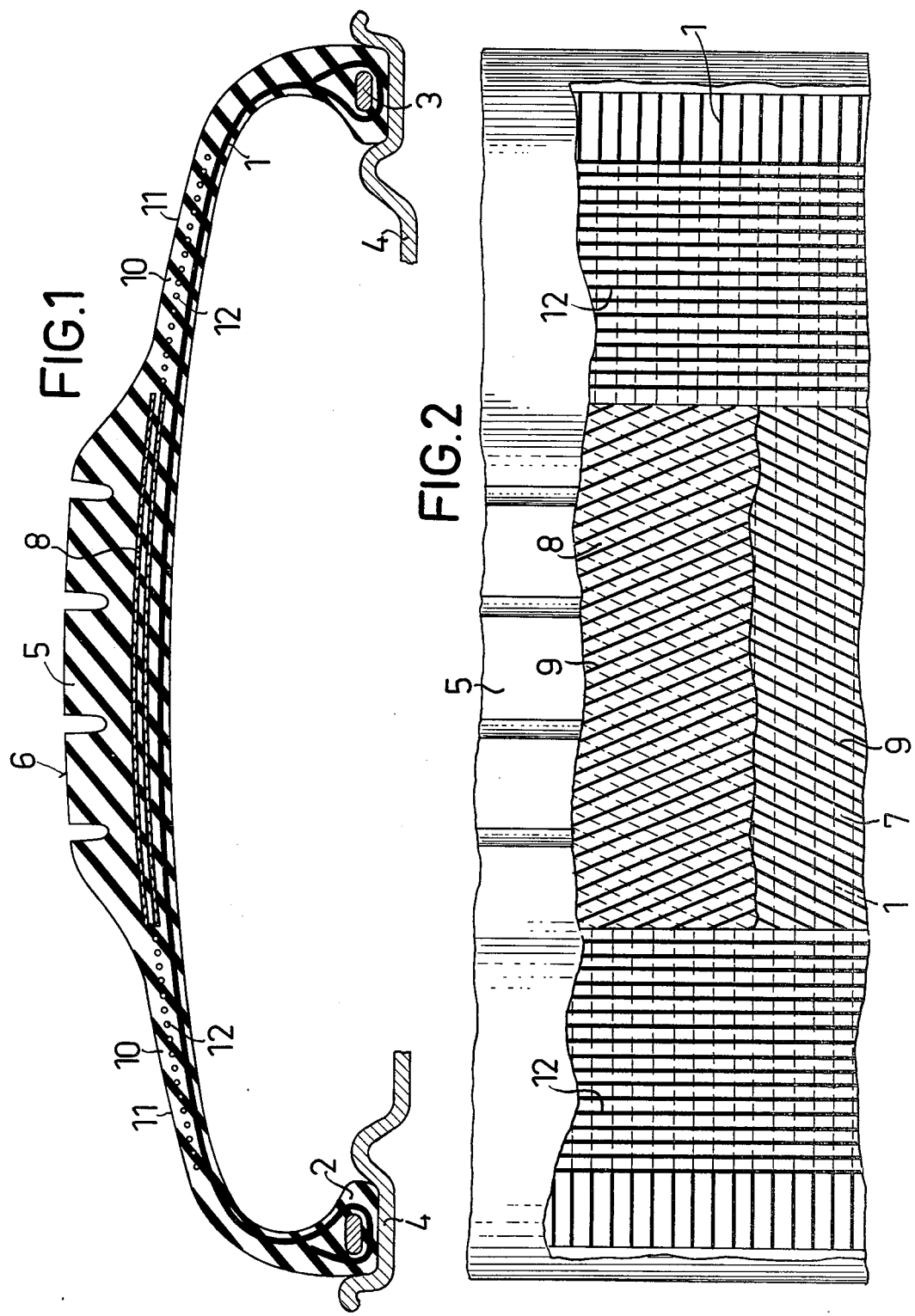

PNEUMATIC VEHICLE TIRE

The present invention relates to a slightly bulged outwardly arched pneumatic vehicle tire having a tread which is narrow in relation to the width of the tire and also having a belt which is pull-resistant in the circumferential direction of the tire and effects the lateral stabilization of the tire.

With known pneumatic vehicle tire of this type, the belt is located below the thread and has a width which essentially corresponds to the width of the tread. In so doing, a lateral stabilization of the tire body is brought about, though only if the belt has a suitable, comparatively rigid structure. However, as a result of this structure, a yielding springing-in of the tire body cannot occur, or at least not to the extent desired.

It is therefore an object of the present invention to provide a pneumatic vehicle tire of the above mentioned general type which, with a sufficient lateral stabilization of the tire body, provides a dynamically flexible comfortable tire.

This object and other objects and advantages of the present invention will appear more clearly from the following specification in connection with the accompanying drawing, in which:

FIG. 1 is a radial partial section through a pneumatic vehicle tire according to the present invention; and FIG. 2 is a partial top view of the tire of FIG. 1 emphasizing the thread-like pull-resistant reinforcing inserts of the tire.

The vehicle tire of the present invention is characterized primarily in that portions of the belt are arranged on both sides of and adjacent to the tread in sections of the tire sidewalls which are essentially cylindrical or slightly conical and extend nearly parallel to the axis of the tire. In addition, the reinforcing inserts which form the belt in the tire sidewalls a considerably smaller angle with the circumferential direction of the tire than do the reinforcing inserts located below the tread. Expediently, that portion of the belt located directly below the tread comprises a crossed arrangement known per se, preferably a symmetrical crossed arrangement. In particular, this crossed arrangement should have the threads arranged at such an angle that a relatively good deformation can occur at the outer periphery of the tire in the region of the tread zone. Those reinforcing inserts which are predominantly responsible for the lateral stabilization of the tire body, and which form the smaller angle with the circumferential direction, are separated from the tread proper and are arranged in those sections of the tire sidewalls which are located on both sides of the tread and are cylindrical or slightly conical. These sections of the tire sidewalls in turn, therefore, do not contribute to making the tire body harder, inasmuch as they must practically exclusively spring-in in response to bending stresses, and do not spring in locally, for example under the effect of obstacles on the roadway as does a tread.

Referring now to the drawing in detail, the tire body, which comprises rubber or similar material, has a width which is three to five times as great as the height of the tire body. The thus somewhat cylindrical or barrel-shaped tire is therefore only slightly outwardly arched.

The carcass of the tire body is formed by radially extending pull-resistant threads or the like which are anchored in the tire bead region 2 on the pull-resistant bead cores 3 by being guided and looped therearound. The tire bead regions 2 rest on a rim 4 which may be formed in any suitable manner.

The tread 5, and the tread surface 6 defined thereby, do not extend over the entire width of the tire body. Rather, they have a width which is only about ⅓ of the entire width of the tire. In this connection, the tread 5 is centrally arranged between the two beads 2.

A belt is located between the tread surface 6 and the threads or the like 1 which form the carcass. However, the belt only extends over the width of the tread surface 6 and comprises two plies 7, 8, the pull-resistant threads or the like 9 of which form with the circumferential direction of the tire an angle of about 20–30°.

Sections 10 of the tire sidewalls 11 are located on both sides of the tread 5. These sections 10 start from the edges of the tread surfaces and are slightly conical. The sections 10 likewise contain pull-resistant threads, strands, or the like 12, which extend in the circumferential direction of the tire.

A dynamically flexible, more deformable zone results below the tread 5 by means of the cross arrangement of the plies 7 and 8. However, local deformations do not occur in the region of the sections 10, so that the threads 12 which are located in the sections 10 and which extend in the circumferential direction of the tire can form sufficiently laterally stiff belt sections.

Of course, criss-crossing strength carriers can also be arranged in the sections 10. However, pursuant to the present invention, this criss-cross arrangement must be such that these strength carriers form smaller angles with the circumferential direction of the tire than do the threads 9 of the plies 7 and 8. The reinforcing inserts, which are predominantly responsible for the lateral stabilization of the tire body, proceed from the tread region into the region of the sidewall which borders the tread region. The sidewall region in turn does not come into contact with the roadway.

It is important to remember that in each instance, even where the sections of the sidewall contain criss-cross inserts, the thread angle beneath the tread must be relatively greater in order to assure a dynamically flexible tire, while the sidewall sections, which do not come into contact with the roadway, to a large extent contain inserts which serve for the bandaging and the lateral stabilization of the tire.

The present invention is, of course, in no way limited to the specific showing of the drawing, but also encompasses any modifications within the scope of the appended claims.

What we claim is:

1. A slightly bulged outwardly arched pneumatic vehicle tire which includes:
   a carcass;
   bead sections;
   sidewalls having sections which are essentially cylindrical;
   a tread centrally arranged between said sidewall sections and having a width which is narrow in relation to the overall width of said tire; and
   reinforcing means located between said carcass and said tread and sidewall sections and pull-resistant in the circumferential direction of said tire, and being intended for effecting lateral stabilization of said tire, said reinforcing means comprising a first belt portion located coaxially mainly below said tread and having at least one threaded ply, the threads of which extend at an angle to the circumferential direction of said tire, and additional second belt portions respectively located projecting essentially axially as an extension of said first belt portion and widening laterally beyond said tread into said sidewall sections and having thread extending at a considerably smaller angle to the circumferential direction of said tire than do the threads of said at least one ply.

2. A tire according to claim 1, in which said first belt portion forms a symmetrical crossed arrangement.

3. A tire according to claim 1, in which the threads of said second belt portions extend at least nearly in the circumferential direction of said tire.

4. A tire according to claim 3, in which the threads of said first belt portion form an angle of about 20°–30° with the circumferential direction of said tire.

5. A tire according to claim 1, in which the width of the respective sidewalls is measured from the pertaining edge of said tread to the respective bead section, the width of the respective second belt portions equaling about one half of the width of the respective sidewall.

6. A tire according to claim 1, in which the width of the respective second belt portions equals about one half of the width of said tread.

* * * * *